US011146460B2

(12) United States Patent
Vela et al.

(10) Patent No.: US 11,146,460 B2
(45) Date of Patent: Oct. 12, 2021

(54) SYSTEM AND METHOD FOR GENERATING A NETWORK DIAGRAM

(71) Applicant: Booz Allen Hamilton Inc., McLean, VA (US)

(72) Inventors: Chelsea Vela, San Antonio, TX (US); Justin Hoffman, Boerne, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 69 days.

(21) Appl. No.: 16/655,946

(22) Filed: Oct. 17, 2019

(65) Prior Publication Data
US 2020/0169476 A1 May 28, 2020

Related U.S. Application Data

(60) Provisional application No. 62/770,895, filed on Nov. 23, 2018.

(51) Int. Cl.
| | | |
|---|---|---|
| H04L 12/24 | (2006.01) | |
| H04L 12/26 | (2006.01) | |
| H04L 29/06 | (2006.01) | |
| G06T 11/20 | (2006.01) | |
| G06T 13/80 | (2011.01) | |
| G06T 19/00 | (2011.01) | |

(52) U.S. Cl.
CPC .............. *H04L 41/22* (2013.01); *H04L 41/12* (2013.01); *H04L 41/142* (2013.01); *H04L 41/16* (2013.01); *H04L 43/045* (2013.01); *H04L 63/1425* (2013.01); *H04L 63/1433* (2013.01); *G06T 11/206* (2013.01); *G06T 13/80* (2013.01); *G06T 19/00* (2013.01); *G06T 2200/24* (2013.01)

(58) Field of Classification Search
CPC ....... G06T 11/206; G06T 13/80; G06T 19/00; G06T 2200/24; H04L 29/06–06013; H04L 29/0653–06625; H04L 29/06823–06986; H04L 41/02–28; H04L 43/02–50; H04L 63/02–029; H04L 63/10–1491; H04L 63/30–308; H04L 69/02; H04L 69/03; H04L 69/08; H04L 69/18; H04L 69/22
See application file for complete search history.

(56) References Cited

U.S. PATENT DOCUMENTS

| | | | |
|---|---|---|---|
| 2003/0020764 A1* | 1/2003 | Germain ................ | H04L 41/22 |
| 2013/0321458 A1* | 12/2013 | Miserendino .......... | H04L 41/22 |
| 2015/0178984 A1* | 6/2015 | Tateishi ................. | H04L 41/22 |
| 2017/0299633 A1* | 10/2017 | Pietrowicz ............. | H04L 41/14 |

* cited by examiner

*Primary Examiner* — Timothy J Weidner
(74) *Attorney, Agent, or Firm* — Buchanan Ingersoll & Rooney PC

(57) ABSTRACT

An exemplary system and method for generating a network diagram. The system includes a first interface for receiving one or more first datasets of network data. A processor configured to generate a first network diagram and identify changes in a network by overlaying one or more network diagram layers or a second network diagram on the first network diagram. The one or more network diagram layers corresponding to captured packets of the first datasets or of second datasets and the second network diagram corresponding to captured packets of the second datasets. A second interface for graphically displaying the network diagram by highlighting and/or animating one or more nodes and/or node connections based on at least one of the identified changes from the overlay.

18 Claims, 12 Drawing Sheets

SYSTEM AND METHOD FOR GENERATING A NETWORK DIAGRAM

STATEMENT REGARDING FEDERALLY-SPONSORED RESEARCH OR DEVELOPMENT

This invention was made in the performance of a Cooperative Research and Development Agreement with the Department of the Air Force. The U.S. Government has certain rights in this invention.

FIELD

The present disclosure is related to cybersecurity, and particularly to generating a network diagram.

BACKGROUND

Network diagrams have remained unchanged since the development of the Internet. In general, Internet network diagrams include many pieces of equipment of different types, different Internet protocols, ports, and a two-dimensional (2D) representation of the expected network layout.

Network diagrams include layouts that are built largely upon assumptions. As a result, a network diagram often becomes unreliable soon after publication and requires constant updating due to real world changes in the network topology.

SUMMARY

An exemplary method for generating a network diagram in a computer system is disclosed, the method comprising: receiving plural first datasets of packets captured from a network; extracting network data for each data set representing one or more of a source or destination of the captured packets; building a first network diagram of interconnected nodes based on the network data extracted from the captured packets of at least one of the plural datasets; overlaying one or more network diagram layers or a second network diagram on the first network diagram, the one or more network diagram layers corresponding to captured packets of the first datasets or of second datasets, the second network diagram corresponding to captured packets of the second datasets, and the overlay identifies differences between: at least two network diagram layers of the first network diagram, one or more network diagram layers including the second dataset of captured packets, or the second network diagram and the first network diagram; and graphically displaying the network diagram by highlighting and/or animating one or more nodes and/or node connections based on the differences identified from the overlay.

An exemplary system for generating a network diagram is disclosed, comprising: a first interface for receiving one or more first datasets of network data; a processor configured to generate a first network diagram and identify changes in a network represented by the network diagram by overlaying one or more network diagram layers or a second network diagram on the first network diagram, wherein the one or more network diagram layers correspond to captured packets of the first datasets or captured data packets of second datasets and the second network diagram corresponds to captured packets of the second datasets.

DESCRIPTION OF THE DRAWINGS

Exemplary embodiments are best understood from the following detailed description when read in conjunction with the accompanying drawings. Included in the drawings are the following figures.

Figure 1:
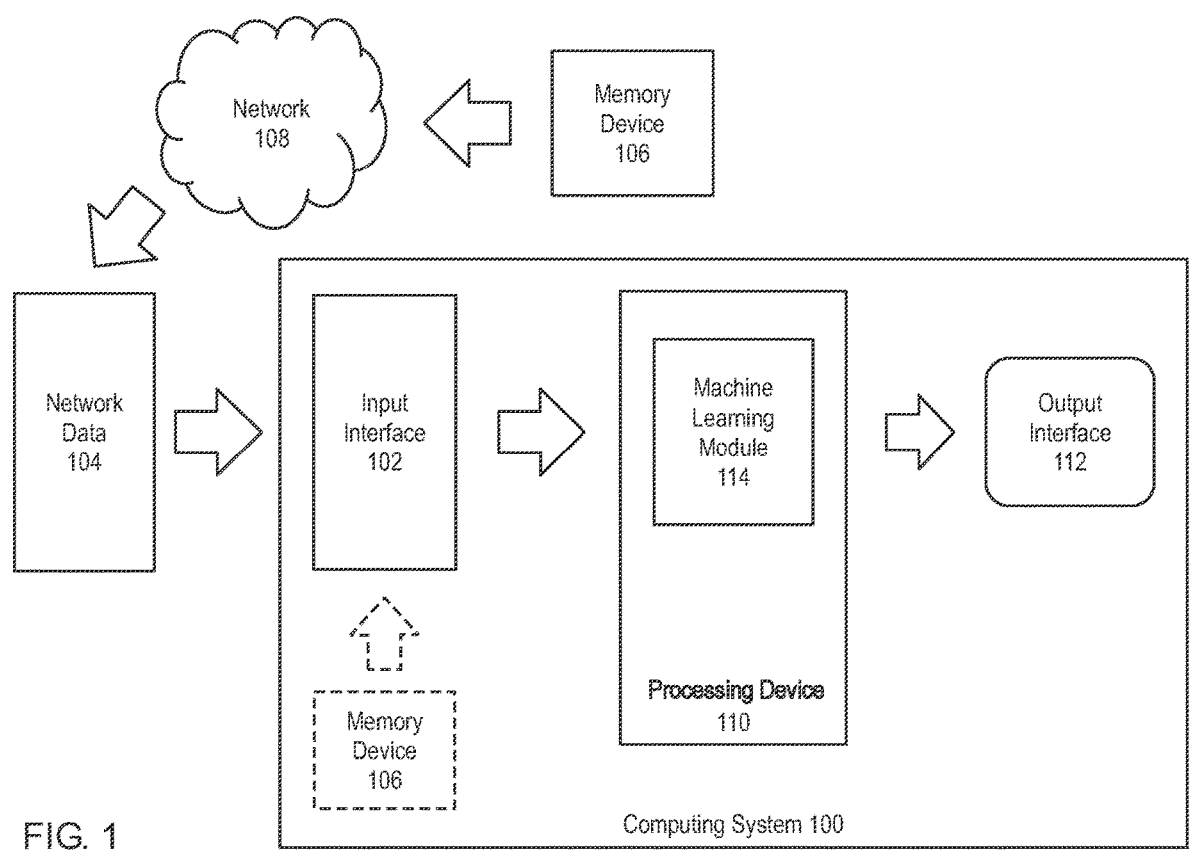
FIG. 1 illustrates a flow diagram of a system for generating a network diagram in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to a system and method for generating a network diagram. The system includes a visualization application that allows cyber analysts and operators to create a network diagram that can be dynamically updated for efficient interaction with large amounts of data. Computer network data 104 in the form of data packets can be captured and entered directly into the computing system 100 of the present disclosure or stored in a memory device as streaming packet capture (PCAP) files, network mapper (NMAP) vulnerability scans, network configuration files, EndPoint/host logs, defense overlays, operations plans, or any other suitable data source as desired. Both the live capture data packets and the stored data files can be ingested or input to the system via an interface. The system processes the stored data files and generates a visualization of the network diagram. The system can be configured to sort the network data 104 based on identified anomalous packets, modify visual characteristics or properties of the nodes such as node colors and sizes, call attention to suspected threats by animating physical properties of the nodes and/or node connections to allow for the re-labeling of threat levels, the retraining of the visualization model through machine learning with each subsequent network diagram that is generated, and the dynamic updating of the network diagram. In this manner, the system enriches the Internet protocol (e.g., header and payload) data included in each packet. The system can be configured to load historical mission data and visualize a network topology having every device and device connection included in the map or diagram. The system can be configured to show multiple different views of the network, where each view can be classified based on the type of device, the amount of data bandwidth through the device, threat level, detected anomalies, or any other factor, property, or characteristic that provides context to the devices or network as desired. The system can visualize the network diagram using static and/or streaming data flows, and the visualization can be generated in two-dimensional (2D), three-dimensional (3D), or three-dimensional virtual reality (3DVR) formats. As a result, the system can allow a user or operator to interact and engage the network to view the network configuration, packets associated with network components, changes to devices and/or connections the network, and highlight devices and/or connections that may be infected.

In the context of the present disclosure the term node defines a point or location in the network where one or more data lines terminate. A node can include a mobile device (e.g., a mobile phone, laptop computer, tablet computer, or other suitable portable processing device as desired), a router, a server, a switch, a client computer, a database, and any other suitable device as desired. The termination point can be a node and include one or more devices or network components configured to process, store, monitor, or output network data 104 based on the desired configuration. As such, in the present disclosure, the term device or component can be used interchangeably with the term node when describing various features and aspects of the network diagram.

The term "network" as used herein can define a computing environment in which interconnected computing devices exchange data with each other over network connections or data links. The data links can be established through any one or a combination of cabling such as coaxial or optical cables, or via wireless media such as Wi-Fi, radio frequency (RF), satellite, cellular, or any other suitable wireless connection as desired.

FIG. 1 illustrates a flow diagram of a system for generating a network diagram in accordance with an exemplary embodiment of the present disclosure.

The methods performed by computing system 100 described herein can be implemented by one or more processing devices 110. For example, at least some of the operations of the described method can be performed by the one or more processors 110 including processing circuits such as an Intel® Core i9-9900K processor. The performance of certain operations can be distributed among the one or more processing devices 110, not only residing within a single machine, but deployed across a number of machines. For example, the one or more processing devices 110 can be located in a single location, while in other examples plural processing devices 110 can be network connected and distributed across a number of remote locations.

According to an exemplary embodiment, the plural processing devices 110 can be configured to operate on a communication network 108 as clients and servers. According to exemplary embodiments of the present disclosure the client and server devices are generally remote from each other and generally interact through the communication network 108 to which they are connected. The client-server relationship can be implemented by virtue of computer programs running on the respective processing devices. According to an exemplary embodiment the processing devices 110 can include permanently configured hardware (e.g., an ASIC, PLC, FPGA, microcomputer, microprocessor, or other suitable hardware device), temporarily configured hardware (e.g., a combination of software and a programmable processor), or a combination of permanently and temporarily configured hardware as desired.

As shown in FIG. 1, each processing device 100 can include an input interface 102 for receiving one or more datasets of network data 104. The input interface 102 can be implemented in hardware, software, or a combination of the two. According to an exemplary embodiment, the input interface 102 can be connected to receive the datasets 104 from a memory device 106 either onboard the computing system 100 or located remotely on the network 108. According to another exemplary embodiment the datasets 104 can be received as live-stream data captured from remote devices on one or more associated networks 108. The one or more associated networks can include Ethernet, IEEE 802.11, Point-to-Point Protocol, or wireless protocols such as Wi-Fi. The datasets 104 can include network data 104 in the form of data packets that are captured and aggregated into streaming data files using any suitable device configured to operate as a packet analyzer. The packet analyzer can be implemented through a combination of hardware and software configured to capture each packet as it travels across the network 108 from a source node to a destination node.

According to an exemplary embodiment, the processing device 110 can be configured to operate as a packet analyzer that includes a sniffer that captures each packet as raw data including the values of various fields in the packet, such as the address fields of the source, destination, and any intermediate devices through which the data packet passes. The data packets can be captured by the packet analyzer at regular or irregular intervals, where each dataset can be used by the system to establish a current or historical snapshot of the network configuration. According to an exemplary embodiment, the packet analyzer can also be configured to perform or execute a vulnerability scan on the network 108 in that the packet data is analyzed to identify weaknesses that can be exploited through unauthorized access the network 108 and/or individual devices on the network 108. The processing device 110 can be a hardware processor encoded with program code for generating a network diagram and identify changes in a network being analyzed by overlaying a first network diagram layer onto a second network diagram layer. Each network diagram layer is generated based on a respective dataset of captured packets. To generate the network diagram, the processor 114 can read one or more of the plural data files from memory 106 and the source or destination data can be extracted from the captured packets to determine the location of each node and node connection in relation to each other.

Figure 2:
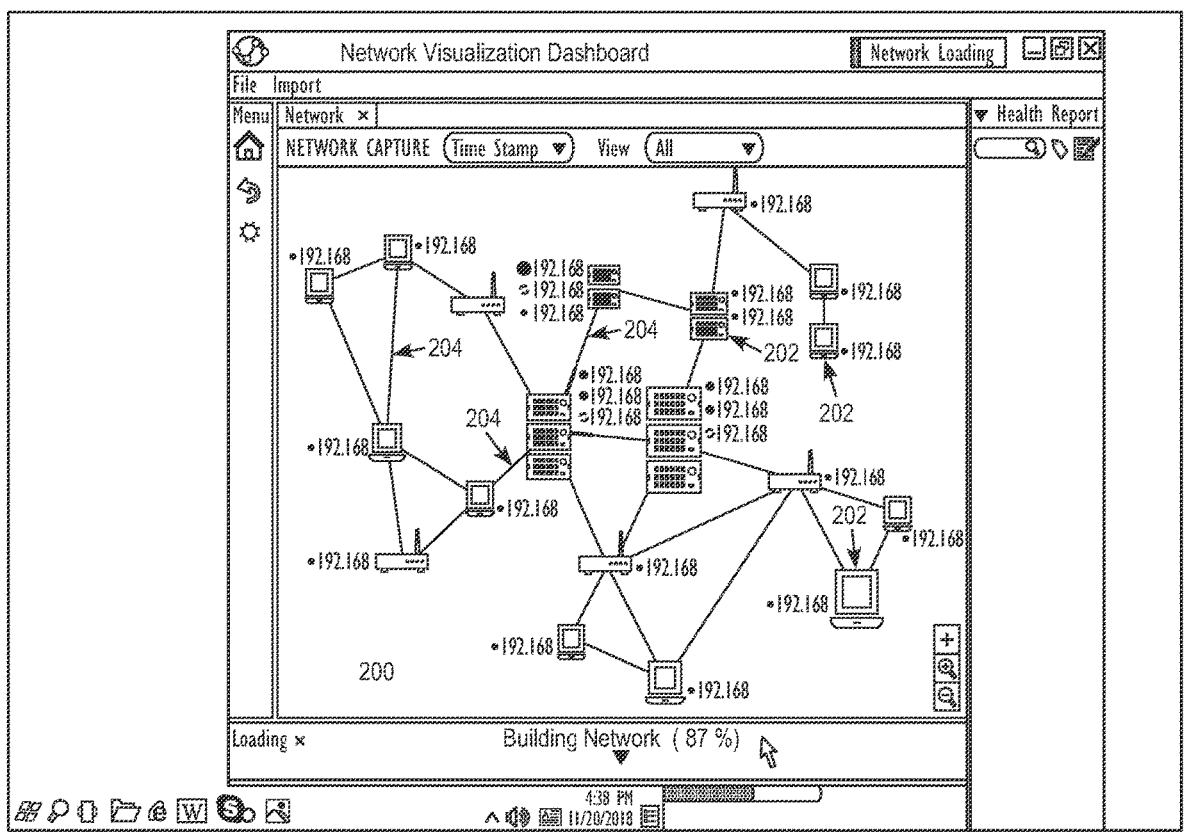
FIG. 2 illustrates a system generated network diagram in accordance with an exemplary embodiment of the present disclosure.

FIG. 2 illustrates a system generated network diagram 200 in accordance with an exemplary embodiment of the present disclosure. As already discussed, the raw packet data can also include data associated with each intermediate node through which the packet passes. The processor 114 can be configured to analyze the received network data included in the raw packet data. The network data can include data or information that represents the source or destination of the data packet or any data or information from which source or destination data can be derived to identify devices and connections in the network 108. The processing device 110 next builds a network diagram 200 of interconnected nodes based on the source and/or destination data extracted from the captured packets of at least one of the plural datasets. Each source, destination, or intermediate device having an address or other identifying information listed in a data packet is represented as a node 202 in the network diagram 200. The connections between the nodes 202 represent the flow path taken by the packets when in-flight from the source to the destination device. A local area network (LAN) 204 can be represented as a cluster of interconnected nodes. A wide area network (WAN) 306 can be represented in the network diagram 200 as having a plurality of interconnected node clusters (e.g., LANs) and devices. Each sub-network (e.g., LAN, WAN) node cluster and node can include multiple layers where accessing each layer provides additional information on various aspects, properties, and/or characteristics of the selected component.

Figure 5:
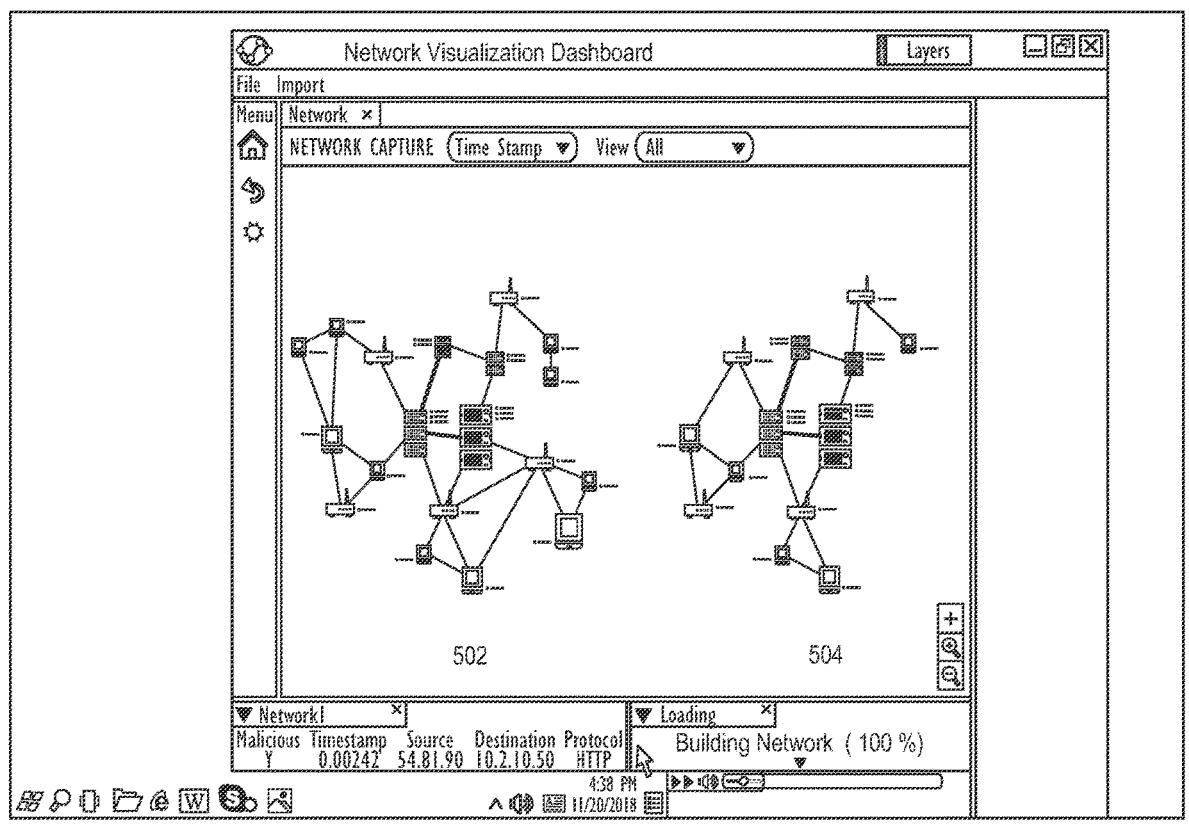
FIG. 5 illustrates first and second layers of a network diagram in accordance with an exemplary embodiment of the present disclosure.
Figure 6:
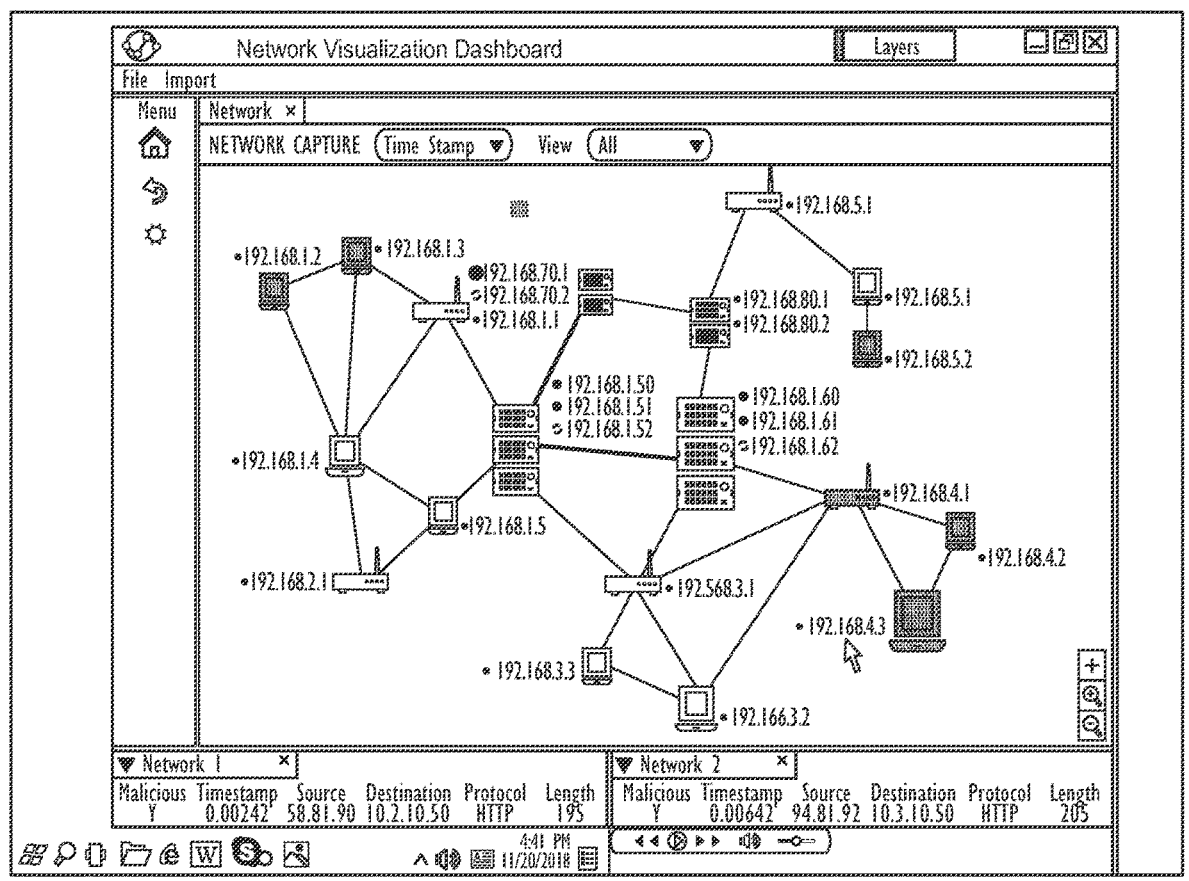
FIG. 6 illustrates an overlay of the first and second network diagram layers of the network diagram in accordance with an exemplary embodiment of the present disclosure.

FIG. 5 illustrates first and second layers 502, 504 of a network diagram 200 in accordance with an exemplary embodiment of the present disclosure. FIG. 6 illustrates an overlay of the first and second layers 502, 504 of the network diagram 200 in accordance with an exemplary embodiment of the present disclosure.

As shown in FIG. 6, new or changed connections in the network 108 are identified or highlighted by a unique color or shading. Based on the comparison of the first and second layers 502, 504 of the network diagram 200, the processor 110 can validate new or changed nodes and/or node connections in the network diagram 200 from the identified differences the first and second network layers 502, 504.

According to another exemplary embodiment of the present disclosure, the processing device 110 can be configured to identify new or changed connections in the network 108 by comparing the network diagram 200 against one or more historical network diagram layers 515. The historical network diagram layers 515 providing a snapshot or state of a network diagram layers at prior point in time. For example, the processing device 110 can be configured to generate a signal that prompts a user to select one or more historical network diagram layers 515 to compare to a network diagram 200. The one or more historical network diagram layers 515 can be selected from memory 106 or a database of previously generated network diagram layers. The processing device 110 can receive the user selection and overlay (e.g., compare) the selected one or more historical network diagram layers 515 to each layer within the network diagram 200. Upon completion of the comparison, the processing device 110 can generate a list of differences between components, devices, and/or node connections in the network diagram 200 and the selected one or more network diagram layers.

According to another exemplary embodiment of the present disclosure, the processing device 110 can be configured to identify new or changed connections in the network by comparing a first network diagram 200 against a second network diagram 250 stored in memory 106 or an external memory or database. For example, the processing device 110 can be configured to prompt a user to select one or more historical network diagrams 250 to compare against the first network diagram 200. The historical network diagrams 250 providing a snapshot or state of the network at a prior point in time. The processing device 110 can receive the user selection and overlay (e.g., compare) the selected one or more historical network diagrams 250 to the current or subject network diagram 200. Upon completion of the comparison, the processing device 110 can generate a list of differences between components, devices, and/or node connections in the subject network diagram 200 and the selected one or more historical network diagrams 250.

Turning back to FIG. 1, the processing device 110 further includes an output interface 112 for graphically displaying the network diagram 200 by highlighting and/or animating one or more nodes and/or node connections based on at least one of the identified changes between the first and second layers 502, 504 of the network diagram 200 and the one or more received datasets 104. According to other exemplary embodiments of the present disclosure, highlighted and/or animated nodes and/or network connections in the network diagram 200 can be displayed based on changes between the network diagram 200 and one or more historical network diagram layers 515 selected from memory or a database, or between the network diagram 200 and one or more historical network diagrams 250 stored in memory or the database.

Figure 7:
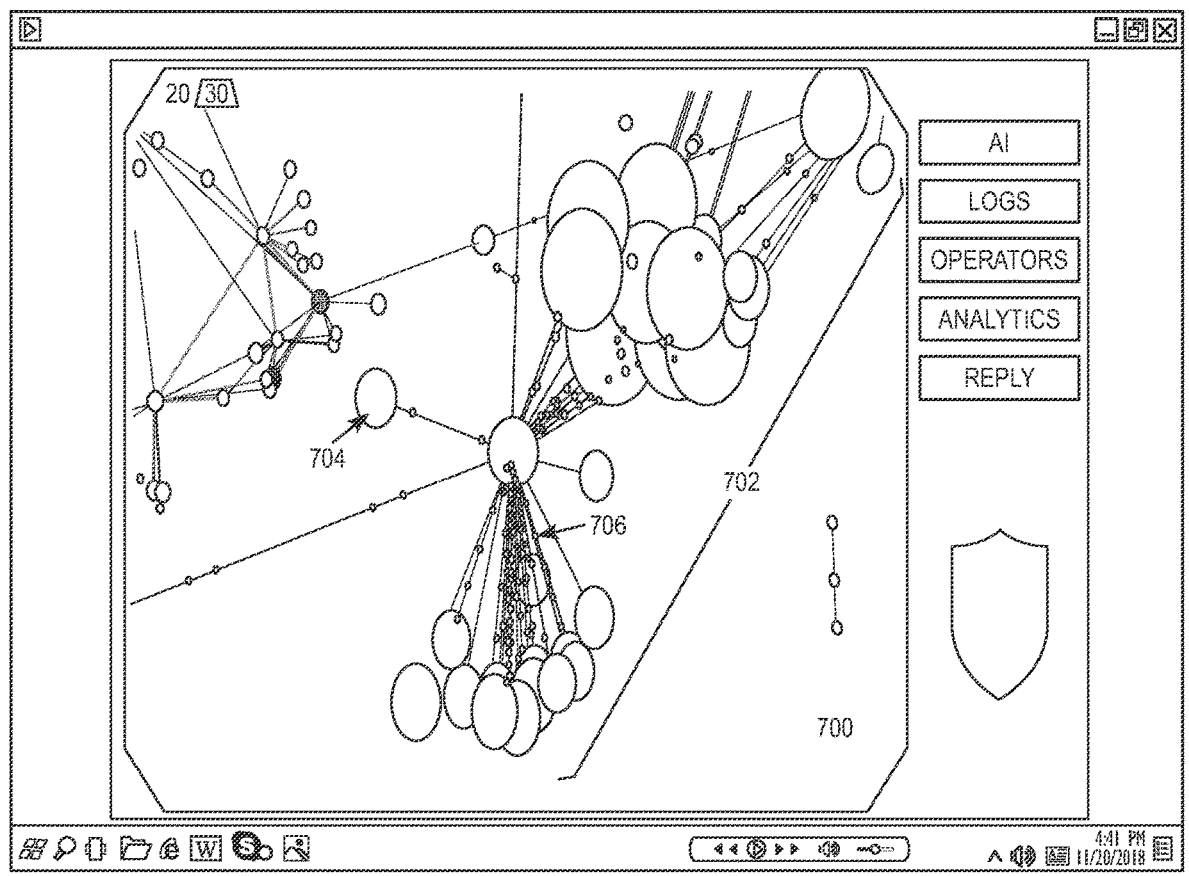
FIG. 7 illustrates a system generated three-dimensional (3D) network diagram in accordance with an exemplary embodiment of the present disclosure.
Figure 8:
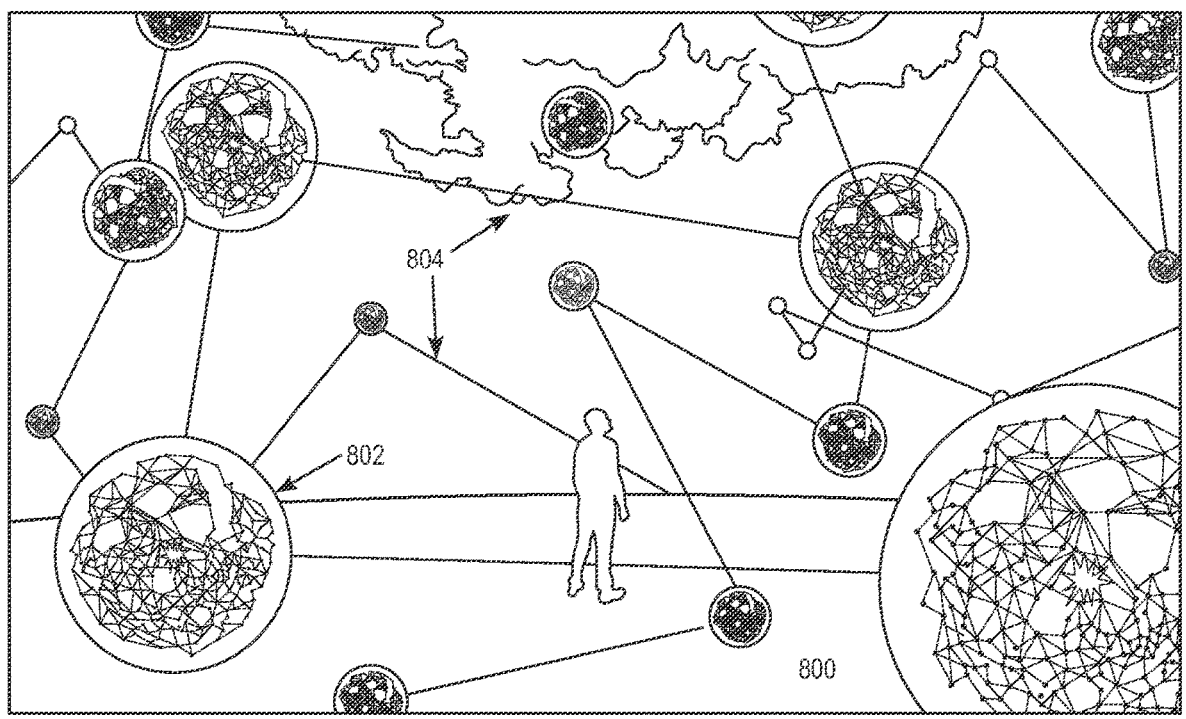
FIG. 8 illustrates plural node clusters of a system generated 3D virtual reality network diagram in accordance with an exemplary embodiment of the present disclosure.
Figure 9:
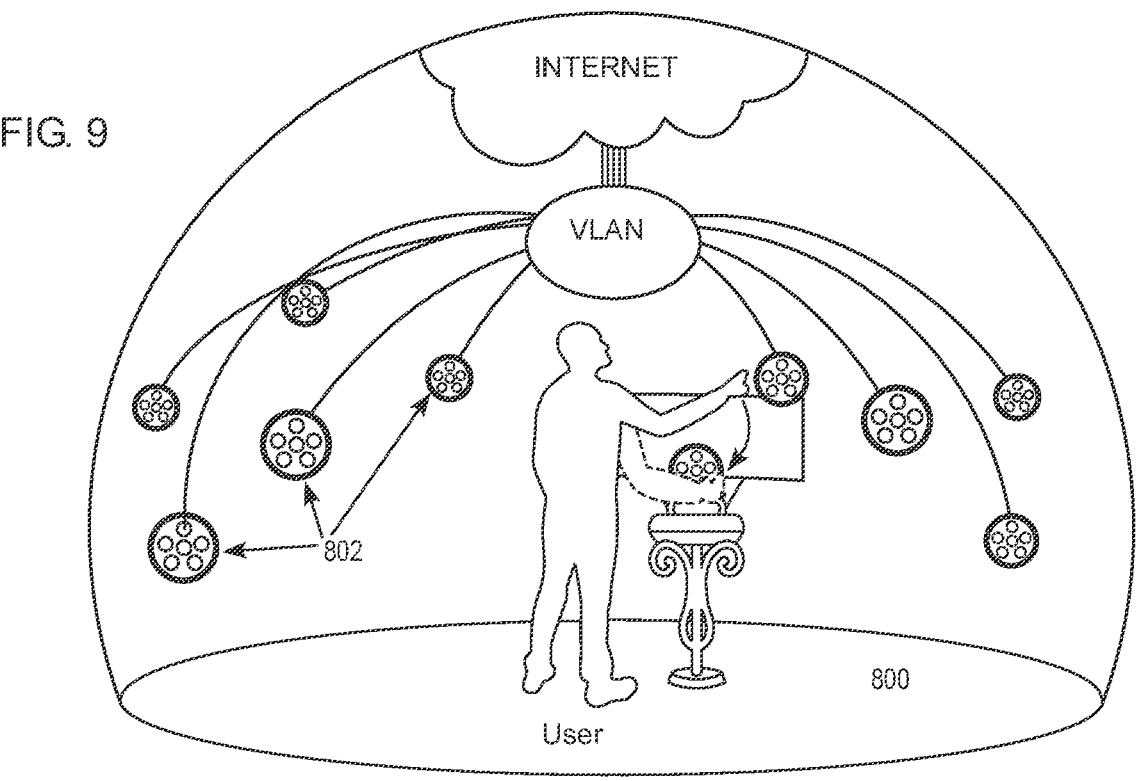
FIG. 9 illustrates interconnected nodes of a system generated 3D virtual reality network diagram in accordance with an exemplary embodiment of the present disclosure.
Figure 9:
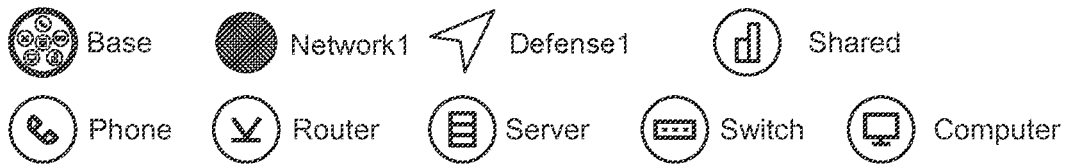
Figure 10:
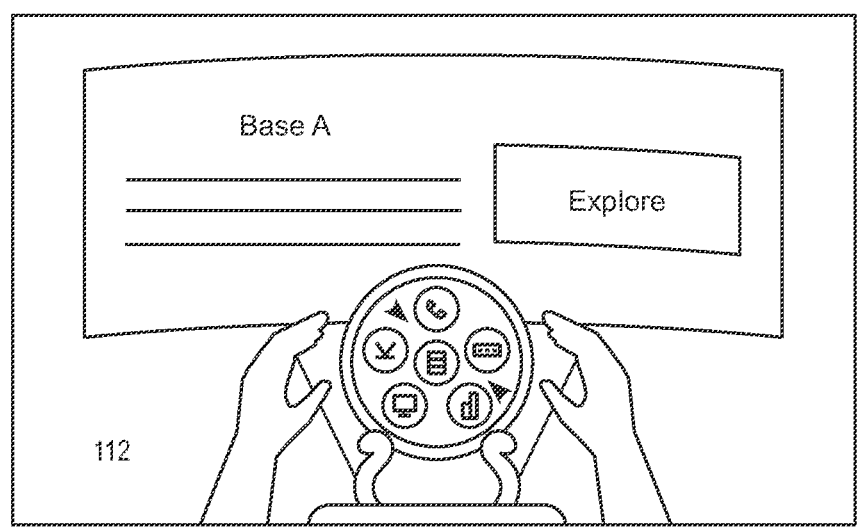
FIG. 10 illustrates a graphical interface for a node cluster of the 3D virtual reality network diagram in accordance with an exemplary embodiment of the present disclosure.

The output interface 112 can be configured to display the network diagram 200 in a two-dimensional (2D), three-dimensional (3D), or three-dimensional virtual reality (3DVR) format. FIGS. 2-6 illustrate a network diagram 200 in which the nodes and node connections are represented in a 2D format. As shown in FIGS. 2-6, the exemplary 2D visualization enables the user to interact with the data by moving a cursor or pointer over the nodes or node connections to view details regarding packet information, configuration information, health information, and threat level. The 2D model of the network 108 also enables the user to discover or highlight new or removed nodes in the network 108 based on a comparison of two datasets of captured packet data via an overlay function of the computing system 100. FIG. 7 illustrates a 3D network diagram 700 generated based on the captured data packets. FIGS. 8-10 illustrate the network diagram 800 generated in the 3DVR format. Each format for visualizing the network diagram 200, 700, 800 on the output interface 112 provides the user or operator with a different and unique experience for interacting with the network 108.

In FIG. 7, the 3D network diagram allows for enhanced visualization and interaction with each node and/or node connection on the network 108. For example, as shown in FIG. 7, the network diagram 700 can allow a user or operator to interact with one or more node clusters or individual nodes in a node cluster 702. As already discussed, each node cluster 702 can be a local area network or other sub-network within the network diagram 700. The 3D network diagram 700 can be generated with nodes 704 and/or node connections 706 having animated properties to highlight data flow, threats, anomalies, or other information deemed significant for determining the health and/or threat level to the network 108 and the health and/or threat level of any nodes 704 and node connections 706 on the network. The 3D map also can be rotated such that further analysis of the network data 104 with regard to the proximity of nodes 704 to one another and the amount of data traffic through a node 704 or node connection 706 being monitored can be appreciated.

As shown in FIGS. 8-10, the network diagram can be visualized as a 3D virtual reality model such that the user or operator can be enveloped or surrounded by one or more nodes 802 and/or node connections 804. FIG. 8 illustrates plural node clusters of a system generated 3D virtual reality network diagram in accordance with an exemplary embodiment of the present disclosure; and FIG. 9 illustrates interconnected nodes of a system generated 3D virtual reality network diagram in accordance with an exemplary embodiment of the present disclosure. As shown, in generating the 3D virtual reality model, the computer system 100 allows the user to interact with the elements of the network diagram 800 by physical actions, such as movement of the head and body, walking or moving in a real word space to access a network component 802, 804, and grabbing a network component 802, 804 to explore its functionality. For example, the user can interact with a node 802 by tapping the node 802 to zoom in or out. The user can select an item/objection of the network diagram 800 and access detailed data and/or information on the network component 802, 804 being viewed, observed, or analyzed. The data used to generate the 3D virtual reality model can be provided via the Internet, where the nodes are connected through a virtual local area network (VLAN).

FIG. 10 illustrates a graphical interface for a node cluster of the 3D virtual reality network diagram in accordance with an exemplary embodiment of the present disclosure. In addition to having a graphical display capability, the output interface 112 can be configured to export reports and files for storage in an onboard memory device 106 of the computing system 100 or remote memory device 106 located on the network 108. The output interface 112 can also be configured to transmit the reports or files to other computing devices over the network 108 using known communication and messaging protocols. The reports and files can be used to memorialize a network 108 configuration and the performance and/or health of a specific network configuration. The files can be reloaded into the computer system 100 for later review and/or analysis.

The processing device 110 in generating a representation of each identified device and device connection on the network 108 can also be configured to generate a health assessment of the network 108, or a device and/or device connection on the network 108. In generating the health assessment, the processing device 110 determines a threat level for one or more nodes and/or node connections based on the vulnerability scan. The output interface 112 can display configuration information, a health assessment, and/or a threat level for a selected node or node connection in the network diagram 200. According to an exemplary embodiment, the configuration information, health assessment, and threat level can be embedded in lower layers of the network diagram 200. For example, the configuration information of the network 108 or each node, device, or device connection in the network diagram 200 can be displayed as an overlay on the network 108 map when the cursor is made to hover over the respective component. The anomalies can be associated with packet flows. An anomaly can be identified by analyzing changes or variations in the number of bytes, packets, and flows during a period under analysis. For example, a Denial of Service (DoS) attack on a network 108 would trigger an anomaly due to the flooding of packets into the network 108 or flow path, which consumes and can overburden network resources. In the context of the present disclosure the period under analysis can be determined by one or more datasets 104 received by the computer system via the input interface 102. An anomaly can be a false positive, if the change in packet flow is due to an authorized action or event such as the establishment of a new connection or flow path or a large data download.

Figure 3:
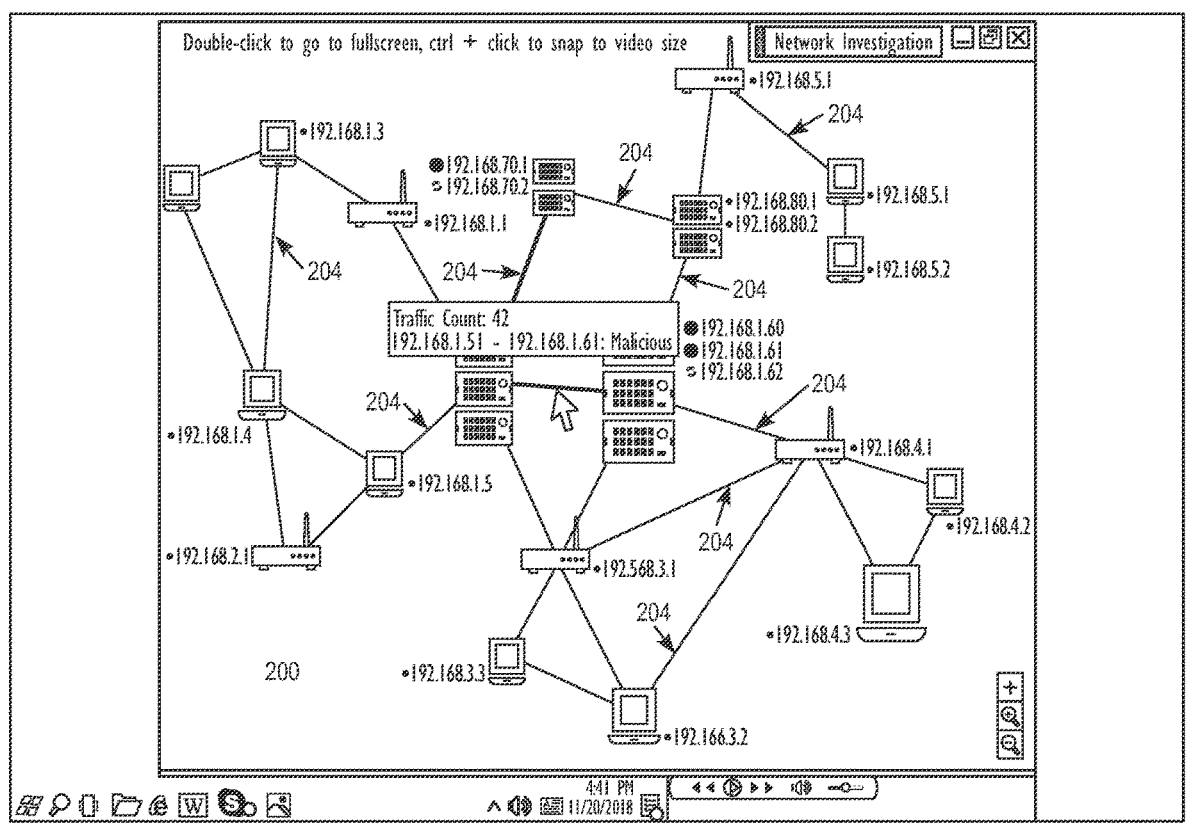
FIG. 3 illustrates a system generated network diagram with node connection data in accordance with an exemplary embodiment of the present disclosure.

FIG. 3 illustrates a system generated network diagram 200 with node connection data in accordance with an exemplary embodiment of the present disclosure. As shown in FIG. 3, the health and/or threat level information associated with the node connection identifies the connection as being malicious. According to another exemplary embodiment, the additional data and/or information concerning nodes, devices, or device connections can be displayed in designated areas of the window displaying the network diagram 200.

Figure 4:
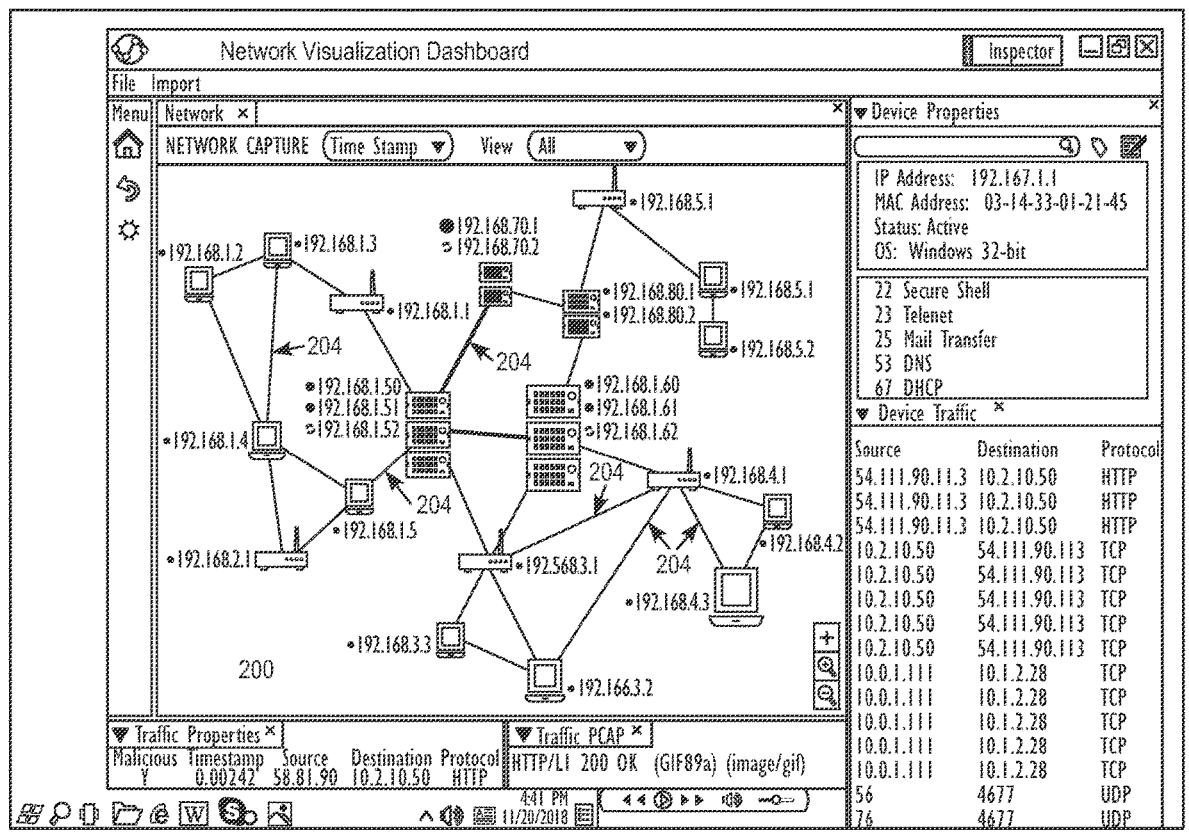
FIG. 4 illustrates a system generated network diagram with node data in accordance with an exemplary embodiment of the present disclosure.

FIG. 4 illustrates a system generated network diagram 200 with node data in accordance with an exemplary embodiment of the present disclosure. As shown in FIG. 4, for example, the window displaying the network diagram 200 can be divided into the sections such than when the user invokes an action for displaying data associated with a component of the network diagram 200, the data can be displayed in one or more designated sections of the network diagram window. By reviewing the additional data on the various components of the network diagram 200 the user or operator can analyze the data of the one or more nodes 202 and/or node connections 204 associated with each threat in combination with other information known about the network 108 to determine whether any of the identified threats are false positives. The user can relabel one or more nodes 202 and/or node connections 204 associated with a false positive threat. In this manner, the operator can update the network data 104 with respect to specific nodes 202 or node connections 204.

The processing device 110 can be encoded with and configured to execute a machine learning module 114. When the machine learning module 114 is executed in combination with the relabeled network data 104, the network diagram 200 can be dynamically updated as the machine learning module 114 is retrained based on the updated labels to optimize the selection and application of labels to nodes 202 and/or node connections 204 for subsequently generated network diagrams. The machine learning module 114 also enables the processing device 110 to control the output interface 112 to graphically display recommendations for addressing threats associated with one or more nodes 202 and/or node connections 204 on the network 108.

Figure 11:
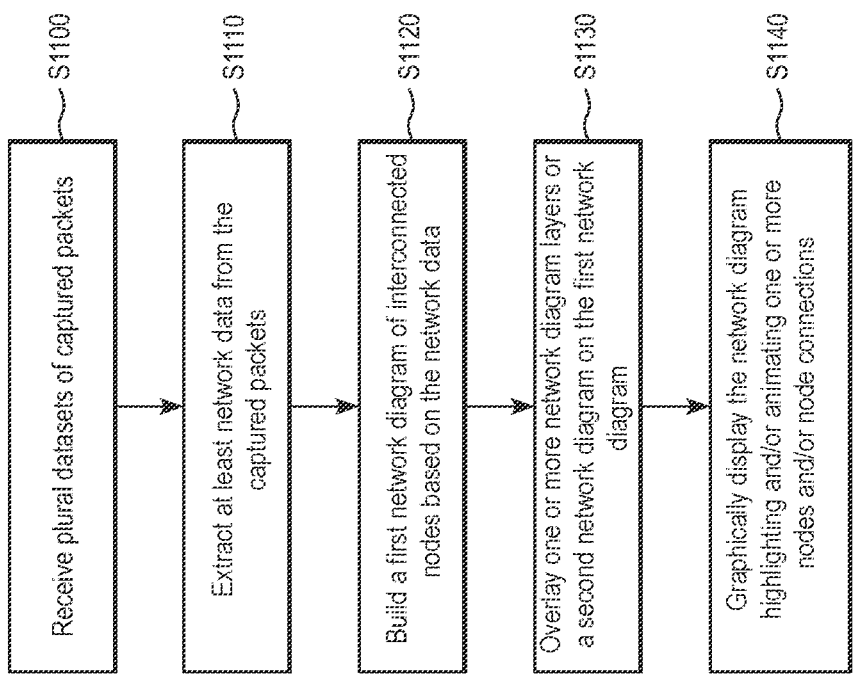
FIG. 11 illustrates a method in accordance with an exemplary embodiment of the present disclosure.

FIG. 11 illustrates a method for generating a network diagram in accordance with an exemplary embodiment of the present disclosure.

Figure 12:
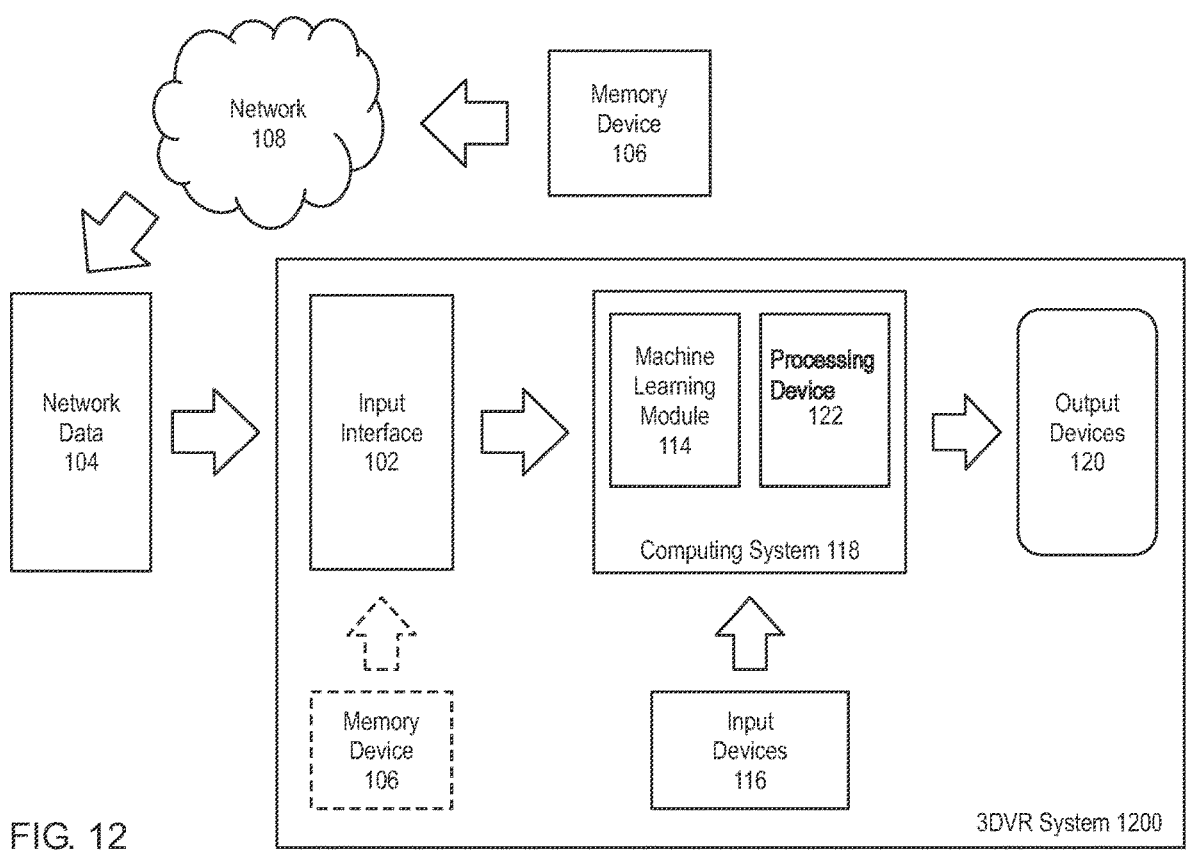
FIG. 12 illustrates an overview of a VR system in accordance with an exemplary embodiment of the present disclosure.

As shown in FIG. 11, the computer system can be configured to receive plural datasets of packets captured from a network 108 (S1100). As already discussed the datasets 104 can include data packets captured as live data received via the input interface 102 from any one of known network protocols including Ethernet, IEEE 802.1, PPP, and wireless technologies. According to another exemplary embodiment, the dataset 104 can include data packets stored in a data file accessed from a memory device 106. The computer system extracts network data from the data packets, which represents at least source or destination data, data or information from which source and/or destination data can be derived, and any other data identifying the complete flow path from the source node to the destination node of each packet (S1110). The dataset 104 can also include vulnerability scan data which is used to determine the health and/or threat level to the network 108 and network components (e.g., server, router, database, switch, computer, or any other network device as desired). The computing system 100 builds a network diagram 200, 800 of interconnected nodes 202, 802 based on the source/destination data extracted from the captured packets of at least one of the plural datasets 104 (S1120). The network diagram 200 can include one or more layers. As a result, the computer system can overlay a first layer 502 onto a second layer 504 of the network diagram 200, or overlay one or more historical layers 515 over the one or more layers of the network diagram 200, or overlay a historical network diagram 250 over the network diagram 200 (S1130). The first network diagram layer 502 and the second network diagram layer 504 correspond to respective datasets 104 of captured packets, the one or more historical network diagram layers 515 and the historical network diagram 250 correspond to snapshots or a status of the network at a prior point in time than the network diagram 200. The overlay identifies differences between the respective datasets 104. The first network diagram layer 502, the second network diagram layer 504, the one or more historical diagram layers 515, and the historical network diagram 250 can represent datasets captured at periodic or non-periodic intervals. The output interface 112 graphically displays the network diagram 200 by highlighting and/or animating one or more nodes and/or node connections based on the differences between the first and second network diagram layers 502, 504, the one or more historical network diagram layers 515 and each layer of the network diagram 200, and the historical network diagram 250 and the network diagram 200 (S1140). As previously discussed, step According to an exemplary embodiment, the computing system 100 can so generate one or more layers in accordance with the 3DVR system. The layers can be generated via a non-immersive, immersive, semi-immersive, or distributed virtual reality system. FIG. 12 illustrates an overview of a VR system in accordance with an exemplary embodiment of the present disclosure. A VR and 3DVR system 1200 in accordance with the present disclosure can include input devices 116 such as position sensors for tracking the position of the user. The position sensors can include electromagnetic, ultrasonic, optical, mechanical, gyroscopic and any other suitable discrete sensor suitable for use in a VR or 3DVR system. In addition, the position sensors can include data gloves, neural controller, and bio or muscular controllers. A point input device such as a 6 DOF (six degrees of freedom) mouse or space ball mouse can be used for control inputs in either a VR or 3DVR arrangement. A VR engine or computing system 118 can be configured to calculate and generate graphical models, object rendering, lighting, mapping, texturing, simulation, and display in real-time based on data received from the one or more input devices 116. The computing system 118 can be configured to periodically recalculate the virtual environment including network diagram 800 based on data received from the input devices to produce a real time simulation and stereoscopic visualization of the network 108. The computing system 118 can be configured to receive one or more datasets via a high speed communication network. The VR system 1200 includes output devices 120 that are configured to receive control signals from the computing system 118 and provide visual, acoustic, or physical stimulation to the user in association with the VR environment. For example, the output devices 120 can include one or more graphic interfaces, audio interfaces, haptic interfaces, and/or savory (e.g., taste, smell) interfaces. One or more processors 122 of the computing system 118 can be configured to include one or more graphical or visual output channels for producing a stereoscopic display or an immersive visualization in a head-mounted display. The one or more processors 122 can be configured to include one or more audio channels for producing three-dimensional or immersive audio output for a realistic experience. The one or more processors 122 can be further configured to generate a control signals for generating haptic responses in one or more haptic interfaces.

According to an exemplary embodiment, the one or more processors 122 can be configured to generate control signals for controlling savory interfaces to output aromas or flavors for stimulating the smell and taste senses of a user as desired.

The one or more hardware processors 122 can be programmed and/or encoded with program code for executing a VR modelling tool for generating 3D graphics, 3D audio, haptic, and other sensory outputs, while also providing dynamic visualizations of the network including using animation, color, sound, smell, or any other desired network status identification scheme or strategy as desired.

According to an exemplary embodiment, the VR system 1200 can be configured to allow a user to select a desired level of immersion and interactivity with the network diagram 800. For example, a non-immersive VR simulation allows a user to view and interact with the 3D network diagram 800 from a top-down view. The system 1200 can generate the non-immersive environment through a combination of output devices including a stereo display monitor, glasses, a keyboard, and data gloves. In a non-immersive VR simulation, the interaction with the network diagram 800 may occur within a 180° viewing range from any point or location in the environment. An immersive VR simulation allows a user to be fully engaged with the network diagram 800 such that a user experiences a feeling of walking through the network diagram. The immersive simulation can allow a 360° viewing range from any point or location in the environment, which allows the user to live within the network and interact with each network node and/or node connection including captured data packets. The user can also engage and interact with one or more network components 802, 804 to view configuration, health, status, and/or or any other information made available by the system. For example, the user can be allowed to touch, rotate, and/or move a selected network component and information related to a selected network component as desired. In an immersive VR simulation a user can be allowed to fully engage with data packets such as viewing in-flight data packets and opening a data packet to view the respective content. A semi-immersive VR simulation provides a user experience that allows a user to engage with certain features of the network diagram such as nodes, but does not allow a full immersive experience, which includes a 360° viewing range from any location in the environment. A distributed VR simulation can allow one or more users to interact with the network diagram 800 as a team. Each user can interact with the virtual environment including the network diagram 800 in the same physical location or from locations remote from each other. The VR system 1200 can be configured to allow the users to have physical, acoustic, visual, and other sensory interactions as desired both with each other and the network diagram 800 in real time.

Once the user selects the desired simulation level the one or more output devices required for the visualization experience can be obtained (e.g., worn) by the user. The user will be able to interact with the network diagram 800 according the various sensory outputs generated by the computing system 118. For example, the user will be able to see dynamic animation and color coding of the network components based on the various status. According to an exemplary embodiment, a node can be visualized to vibrate, shake, pulse, strobe, or have any other animated attribute as desired based on one or more alert levels detected by the one or more hardware processors 122. The node can also have an audio response associated with the visual attribute such as a specified tone synchronized with the animated movements. It should be understood that the computing system 118 can include a graphical interface allowing a user to specify a configuration and/or setting of the various sensory attributes and responses of the components and features 802, 804 of the network diagram 800 based on the determined and/or identified status. Based on the level of immersion selected the user can hear sounds from one or more directions such that the user can be alerted to the status of network components 802, 804 even when they are located behind or peripheral to a current field of view of the user. The user can obtain real-time configuration, attribute, and/or status information on for each node and/or node connection by interacting (e.g., selecting) with the network component 802, 804 as desired. According to an exemplary embodiment, the response attribute of a selected node can be changed.

According to an exemplary embodiment, a user can interact with one or more data packets by selecting a data packet while it is in flight between nodes. The selection of a packet can include haptic feedback. Furthermore, the data packets can have user-specified visual and/or acoustic attributes based on a status, flow direction/path, source node, destination node, threat level or any other data characteristic as desired. As already discussed the visual and acoustic attributes can include synchronized animation and tone responses that can be specified by the user when configuring the VR simulation. It should be understood that the information and data visualized through the 2D format as described with respect to FIG. 4, can also be visualized in a similar manner in the 3D and 3DVR formats. For example, as the user is immersed in the network diagram 800 data concerning the respective nodes 802 and/or node connections 804 can be displayed on or in close proximity to each network component. According to another exemplary embodiment, the user can view the node data and/or real-time information by interacting with the node via the input devices discussed herein.

The exemplary systems and methods for generating a network diagram or map 200, 800 can be integrated with known packet capture, packet analyzer, or vulnerability scan systems. The exemplary embodiments of the present disclosure can be used, for example, to generate a dynamic visualization of a network 108 during an exercise of penetration and stress testing of a network 108 with threat avoidance. The visualization can provide individual and tailored assessments of the network 108 and/or the network components (e.g., nodes, node connections), model various scenarios encountered during the exercise, and test the network 108 on re-training objectives of the machine learning module 114.

The computer program code for performing the specialized functions described herein can be stored on a medium and computer usable medium, which may refer to memories, such as the memory device 106, which may be memory semiconductors (e.g., DRAMs, etc.). These computer program products may be a tangible non-transitory means for providing software to the computing systems 100, 118. The computer programs (e.g., computer control logic) or software may be stored in the memory device 106. The computer programs may also be received via the communications interface. Such computer programs, when executed, may enable the computing systems 100, 118 to implement the present methods for generating a network diagram 200, 700, 800 as discussed herein. In particular, the computer programs, when executed, may enable the processing devices 110 and 122 of computing systems 100 and 118, respectively to implement the methods as discussed herein. Accordingly, such computer programs may represent controllers of processing devices 110 and 122. Where the present disclosure is implemented using software, the software may be stored in a computer program product or non-transitory computer readable medium and loaded into the processing devices 110 and 122 using a removable storage drive, an interface, a hard disk drive, or communications interface, where applicable.

The computing systems 110, 118 can be configured to include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling processing devices 110, 122 to perform the functions disclosed herein. It will be apparent to persons having skill in the relevant art that such processes result in the computing systems 100, 118 being specially configured computing devices uniquely programmed to perform the functions discussed above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for generating a network diagram in a computer system, the method comprising:
   receiving plural first datasets of packets captured from a network;
   extracting network data for each data set representing one or more of a source or destination of the captured packets;
   analyzing the network data extracted from the captured packets to identify nodes and/or node connections in the network, determine a health of at least one of the identified nodes, and to perform a vulnerability scan which identifies weaknesses in at least the network and at least one of the identified nodes in the network;
   building a first network diagram of interconnected nodes based on the analyzed network data by generating a representation of each identified node and/or node connection on the network;
   overlaying one or more network diagram layers or a second network diagram on the first network diagram, the one or more network diagram layers corresponding to captured packets of the first datasets or of second datasets, the second network diagram corresponding to captured packets of the second datasets, and the overlay identifies differences between: at least two network diagram layers of the first network diagram, one or more network diagram layers including the second dataset of captured packets, or the second network diagram and the first network diagram; and graphically displaying the first network diagram by highlighting and/or animating one or more nodes and/or node connections based on at least the differences identified from the overlay, the health of at least one of the identified nodes, and weaknesses of the network and the at least one identified node in the network.

2. The method according to claim 1, comprising:
capturing the first and second datasets of packets at regular or irregular intervals.

3. The method according to claim 2, wherein each dataset includes raw network data.

4. The method according to claim 3, wherein each dataset includes data associated with the vulnerability scan of the network.

5. The method according to claim 1, comprising:
storing the received datasets in memory.

6. The method according to claim 1, wherein extracting the network data from the captured packets comprises:
reading one or more of the plural data files from memory.

7. The method according to claim 1, wherein building the network diagram comprises:
performing a health assessment of the network to determine a threat level of the identified nodes and/or node connections, wherein each identified device and device connection corresponds to a respective node and node connection in the network diagram.

8. The method according to claim 7, wherein the health assessment of the network comprises:
determining the threat level for the one or more nodes and/or node connections based on the weaknesses identified by the vulnerability scan.

9. The method according to claim 8, comprising:
displaying configuration information of the network, the health assessment, and/or the threat level associated with one or more threats identified for a selected node or node connection in the network diagram.

10. The method according to claim 8, wherein the computer system is encoded with a machine learning module, the method comprising:
relabeling one or more nodes and/or node connections associated with a false positive threat; and
retraining the machine learning module to rebuild the network diagram based on the one or more relabeled nodes and/or node connections.

11. The method according to claim 10, comprising:
graphically displaying recommendations for addressing identified threats associated with one or more nodes and/or node connections on the network.

12. The method according to claim 1, comprising:
validating new or changed nodes and/or node connections in the network diagram from the identified differences between the at least two network diagram layers of the first network diagram, between the one or more network diagram layers of the second dataset of captured packets and the first network diagram, or between the second network diagram and the first network diagram.

13. The method according to claim 1, wherein the network diagram is a two-dimensional representation of the network, a three-dimensional representation of the network, or a three-dimensional virtual reality representation of the network.

14. A system for generating a network diagram, comprising:
a first interface for receiving one or more first datasets of network data;

a processor configured to generate a first network diagram and identify changes in a network represented by the first network diagram by overlaying one or more network diagram layers or a second network diagram on the first network diagram, wherein the one or more network diagram layers correspond to captured packets of the first datasets or captured data packets of second datasets and the second network diagram corresponds to captured packets of the second datasets, the processor is further configured to analyze the network data from the captured packets to identify nodes and/or node connections in the first network diagram, determine a health of at least one of the identified nodes, perform a vulnerability scan which identifies weaknesses in at least the network and at least one of the identified nodes in the network, and generate a representation of each identified node and/or node device connection in the first network diagram; and a second interface for graphically displaying the first network diagram by highlighting and/or animating one or more nodes and/or node connections based on at least one of the identified changes from the overlay, the health of at least one of the identified nodes, and weaknesses of the network and the at least one identified node in the network.

15. The system according to claim 14, wherein the processor is configured to identify an anomaly and/or threat in one or more nodes and/or node connections based on the weaknesses identified from the vulnerability scan, and
wherein the processor is encoded with a machine learning module, and the processor is configured to generate a user prompt for relabeling one or more nodes and/or node connections associated with one or more false positive threats, and retrain the machine learning module by executing the machine learning module to rebuild the first network diagram based on the one or more relabeled nodes and/or node connections.

16. The system according to claim 15, wherein the processor is configured to execute the machine learning module to generate recommendations and actions for resolving each anomaly, the recommendations and actions being generated based on the received datasets and the re-labeling of network nodes and connections with each iteration of a network diagram generation.

17. The system according to claim 14, wherein each dataset includes current or historical network data.

18. A method for generating a network diagram, comprising:
receiving plural datasets of packets captured from a network;
extracting Internet Protocol (IP) data from the captured packets;
analyzing the network data extracted from the captured packets to identify nodes and/or node connections in the network and anomalous packets, determine a health of at least one of the identified nodes, and perform a vulnerability scan which identifies weaknesses in at least the network and at least one of the identified nodes in the network;
enriching the IP data based on data flow between network nodes by analyzing changes in the one or more nodes and/or node connections of the network diagram; and
generating a visualization of the data flow, the visualization including animated properties of one or more nodes and/or node connections based on the enriched IP data, the health of at least one of the identified nodes, and weaknesses of the network and the at least one identified node in the network.

\* \* \* \* \*